Dec. 22, 1964     A. M. MARTIN     3,161,984
ANIMAL TRAP

Filed July 18, 1961     2 Sheets-Sheet 1

INVENTOR
*Andrew M. Martin*

BY *Mason, Fenwick & Lawrence*
ATTORNEYS

Dec. 22, 1964   A. M. MARTIN   3,161,984
ANIMAL TRAP
Filed July 18, 1961   2 Sheets-Sheet 2
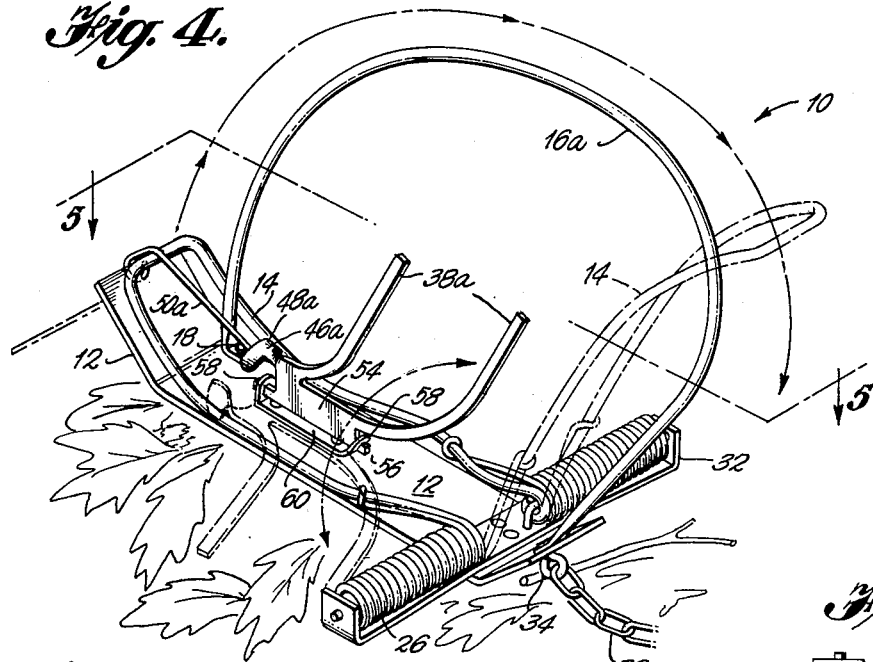
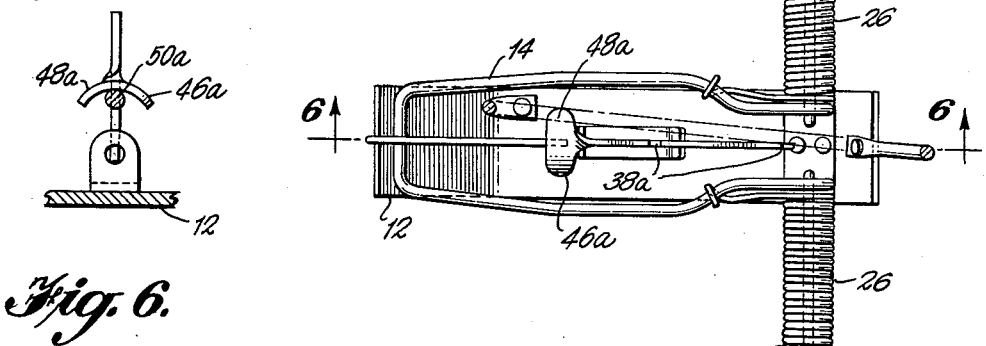
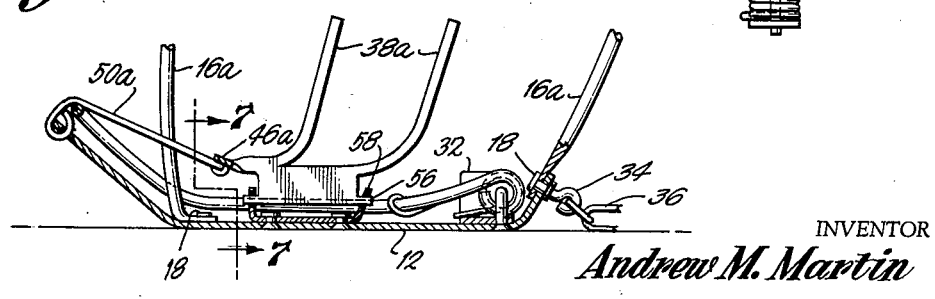
INVENTOR
Andrew M. Martin
BY Mason, Fenwick & Lawrence
ATTORNEYS

United States Patent Office 3,161,984
Patented Dec. 22, 1964

3,161,984
ANIMAL TRAP
Andrew M. Martin, R.R. 2, Box 66, Felton, Del.
Filed July 18, 1961, Ser. No. 124,834
1 Claim. (Cl. 43—85)

This invention relates generally to an animal trap. More particularly, this invention is concerned with a humane animal trap which will operate to spring closed when the animal is substantially within the confines of the trap.

There have been many animal traps known in the art for catching a variety of animals. In the past, the animal traps of the humane type which are designed to break the neck or back of the animal as distinguished from merely grasping and holding one of the extremities of the animal, have been deficient in that there is the strong possibility that the animal would trigger the trap closed at a time when only a portion of its body is within the trap. This has resulted in the trap closing prematurely on one of the foremost extremities of the animal, or more likely, just sliding over and off the top of the head, thereby permitting the animal to go free. As examples of the type of trap that may be triggered before the animal is fully within the trap, the following patents are mentioned: Hooker 390,021, Bloker 680,114, Thompson 901,851, Hoffman 1,064,647, Cooper 1,726,694, Nerby 1,881,871.

In each of the above mentioned patents the trigger can be operated by either the animal stepping upon the trigger or the animal moving the trigger with merely the fore part of the body, such as the head against the trigger. In each and every case, the animal may set off the trap without being fully within the closing area of the jaws or other moving structure of the trap.

Consequently, it is a primary object of the present invention to provide a humane animal trap which is designed to close when the animal is substantially fully within the trap.

It is also an object of the present invention to provide a humane animal trap having at least one movable jaw which is triggered to contain the animal when the animal is substantially within the trap.

It is an additional object of the present invention to provide a trap that will be adjustably triggered to a closed position, in accordance with the extent of the animal that is within the trap.

An additional object of this invention is to provide animal contact means which extends into the space between the jaws of the trap, and which controls the closing of the trap to a time when the animal is substantially within the trap.

A further and more limited object of the present invention is to provide animal contact means for controlling the triggering or closing of the jaws of the trap which moves transversely across the plane of movement of the jaws of the trap.

A still more limited object of the present invention is to provide a novel locking means which adjustably varies the extent that the animal must be in the trap before the trap closes.

These and other objects of the present invention will become readily apparent upon careful consideration of the following description for the present invention, when taken together with the accompanying drawings wherein:

FIG. 4 is a perspective view of a somewhat different embodiment of the present invention;

FIG. 5 is a sectional view, taken along the line 5—5 of FIG. 4;

FIG. 6 is an elevational view in section, taken along the line 6—6 of FIG. 5;

FIG. 7 is a cross-sectional view taken along the line 7—7 of FIG. 6, showing the cooperation between the latching and locking means.

In general, the present invention incorporates on an animal trap, spring urged jaws which include therebetween a trigger assembly having a pivoted animal contact means which the animal must move a pre-determined distance by entering the trap before the trap will be triggered. The novel locking means provided, determines through its extent the degree of movement necessary by the animal contact means before the locking means will release the latching means. The animal contact means is particularly designed to accomplish the objects of this invention as it is pivotally mounted for movement transversely of the plane of movement of the jaws.

Figure 1:
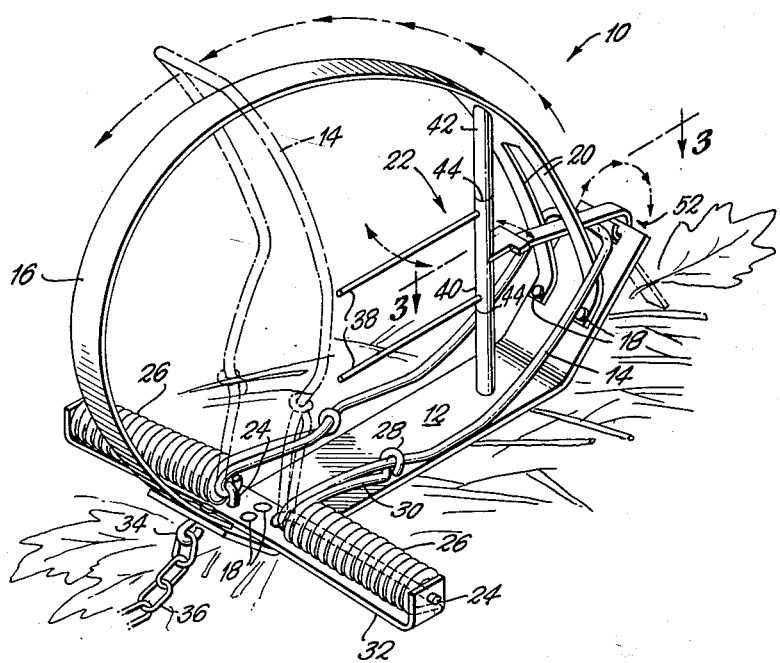
FIG. 1 is a perspective view of the humane animal trap according to the present invention, showing the trap in a cocked position in solid lines, and in the partly closed position in phantom.
Figure 2:
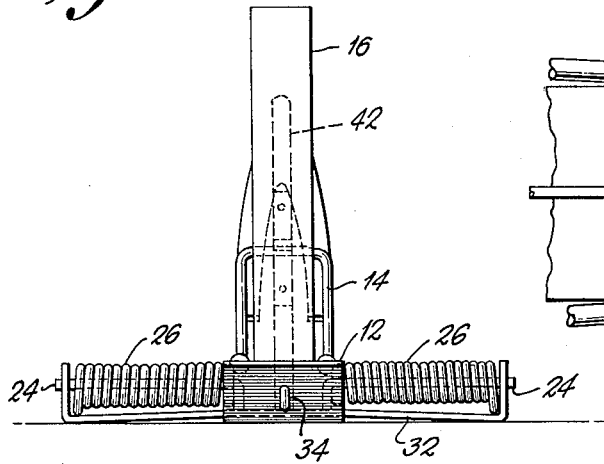
FIG. 2 is a front elevation of the trap, as shown in FIG. 1 when the trap is in a cocked position.

The invention more specifically comprises an animal trap 10, having a frame 12, to which is attached at least one movable jaw 14. The embodiment of the present invention shown in FIG. 1, includes a single movable jaw 14 formed of heavy metal shaped as an elongated loop. It is to be understood that the trap may have more than one movable jaw which may vary according to the choice of the trapper. Also, as shown in FIG. 1, a stationary jaw 16 taking the form of a semi-circular loop, is suitably secured as by rivets 18 to the frame 12, and threaded through the open movable jaw 14. The stationary jaw 16 is made of heavy metal and is bifurcated at one end to form legs 20 in order that the stationary jaw straddle a portion of the trigger assembly shown generally at 22.

The movable jaw is suitably pivoted in a conventional manner about a pair of axes 24, for movement from one side of the trap to the other. To induce this pivotal movement of the jaw, stiff coiled torsion springs 26 are secured to the movable jaw in a well known manner, such as by U-shaped ends 28 at the ends of spring arms 30, the spring 26 and the axes 24 are supported on U-shaped transverse member 32 secured to the frame 12, with any suitable means such as rivets 18. Connected to the underside of the frame, as shown in FIG. 1, is an eye bolt 34 to which is attached a chain 36 for securing the trap to the ground.

The trigger assembly shown generally at 22, includes an animal contact means 38 which is shown in Fig. 1, comprising a pair of elongated rods which protrude into the space between the jaws 14 and 16 when in a cocked position, as shown in solid lines. The number of the rods 38 forming the animal contact means is a matter of choice. However, it should be clear that the greater the number of rods within practical limits, the less the chance for the animal to pass through the trap without touching or moving the animal contact means. The embodiment shown in Fig. 1 includes two such rods which is found to be the preferable number. These rods constituting the animal contact means, should extend into the space between the jaws a distance such that the animal could not possibly pass through the trap beyond the ends of the rods without contact with them. This distance, of course, will vary according to the animal to be trapped. While the rods are shown to be substantially horizontal, they need not be positioned in this manner, since the only requirement is that they prevent an animal from passing through the trap without contact with them.

The animal contact means is secured to an upright sleeve 40 which pivots freely about a vertical shaft 42.

The shaft 42 may be reduced between points 44 to accommodate the sleeve 40 for pivotal movement without axial movement along the shaft 42. The manner in which the contact means 38 pivots on the shaft 42 is not critical, and it should be clear that any abutment means at 44 that would hold the sleeve 40 vertically positioned along the shaft 42, would be satisfactory.

Secured to the sleeve 40 for pivotal movement with the animal contact means 38 is a locking means 46 which may take the form of a T-shaped flat metal member wherein the head 48 of the T constitutes an important part of the present invention. The head 48 is designed to lock and override a latch 50, which is pivoted at one end as at 52 to the frame 12. The latch 50 must be made of sturdy material, such as bar metal, which can be suitably attached to the frame such as at 52. The latch 50, when in a forward horizontal position such as is shown in solid lines of Fig. 1, will hold the spring urged jaw 14 in a cocked position, and will retain the jaw in that position until the latch is released by reason of the head 48 pivoting across the top of the latch, and finally off the edge of the latch 50. At this time the normal urging of the jaw 14 will tend to flip the latch 50 upwardly and rearwardly according to the arrows shown in FIG. 1 thus releasing the jaw 14 for snap contact with the animal against the stationary jaw.

It is to be noted that there are several factors which determine the triggering of the trigger assembly in general and the movement of the jaw 14 from a cocked position in particular. One is the positioning of the animal contact rods 38 and their relative positions within the trap. The rods, as shown, are designed for movement transverse of the plane of relative movement of the jaws. Thus, the only way the jaw can be sprung would be for the animal to pass substantially into the trap, moving as it goes the rods 38 transversely of the plane of movement of the jaws until such time as the rods 38 move the sleeve 40 to the extent that the head 48 of the T-shaped locking means will override the edge of the latch 50 to release the latch.

Figure 3:
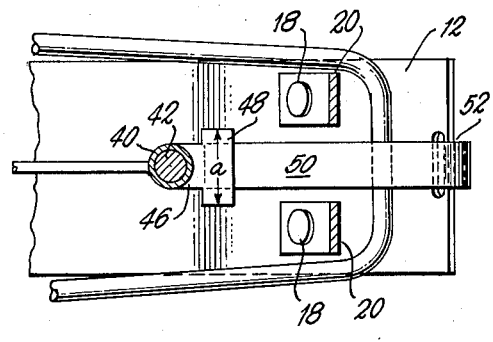
FIG. 3 is a sectional view of the trap taken along the line 3—3 of FIG. 1 showing the locking and latching means.

Another factor in the actuation of the trigger assembly is the length or extent of the head 48. It can be readily seen that if the head 48 extends a greater distance than that shown by the letter *a* in FIG. 3, the greater movement of the rods will be permitted before releasing the latch 50. Conversely, if *a* is a smaller dimension, less pivotal movement of the rods 38 will cause release of the latch 50. Therefore, it can be seen that the sensitivity of the trigger assembly can be easily varied by the trapper.

In this connection the sleeve 40 may be a split surround of spring-like material such that it can be easily removed from the shaft 42 in order that another sleeve be positioned thereon having rods of different number and/or length as well as a variance in the T or locking means 46.

The embodiment shown in FIG. 4 is much like that shown in FIG. 1, except for the trigger assembly and the stationary jaw. According to the drawing the alternate embodiment of the present invention includes a stationary jaw 16a which is of a U-shaped rod secured to the frame by the conventional rivets 18, and which is again threaded through the movable jaw 14, as previously described. The latch 50a is round or rod-shaped in cross-section, as best shown in FIG. 7. Its function is similar to the function of latch 50 in FIG. 1, and again is suitably pivoted to the frame 12. Over-riding the end of the latch 50a is the locking means 46a, which has a downwardly concave cross head 48a and is in sliding contact with the latch 50a. The locking means 46a is conveniently secured to animal contact means 38a taking the form of an upstanding U-shape having a thickened base 54. The base 54 is provided with protruding ears 56 at both ends, which are secured within trunnions 58 formed in a U-shaped plate 60 suitably secured to the frame 12.

As can be seen in FIG. 4, the animal contact means 38a moves transversely of the plane of movement of the jaws in a manner generally similar to the embodiment shown in FIG. 1, except that the legs of the contact means are more or less upright, rather than horizontal, and the pivotal axis 56 of the contact means 38 is horizontal rather than vertical. However in accordance with the spirit of this invention, in embodiment of FIG. 4 the animal again must pass substantially through the trap to move contact means 38a transversely of the trap before the cross head 48a will release the latch 50a to spring the trap. Similarly, the length of the arc formed by cross head 48a will determine the sensitivity of the trap.

From the foregoing detailed description, it will be evident that there are a number of changes, adaptations, and modifications of the present invention which come within the province of those skilled in the art. However, it is intended that all such variations not departing from the spirit of the invention, be considered as within the scope thereof as limited solely by the appended claim.

I claim:

An animal trap comprising a frame, first and second jaws supported on said frame, said second jaw having a substantially round shape and fixedly secured to said frame, said first jaw being formed of an elongated loop enclosing at the height of said loop said second jaw, said first jaw being pivotally mounted on said frame for movement toward and away from a side of said second jaw adjacent the pivotal mounting of said first jaw to form an open and closed position, a sole animal entrance having an axis perpendicular to the plane of pivotal movement, a trigger assembly releasably preventing relative movement between said jaws, said trigger assembly being provided with animal contact means including a plurality of vertically disposed, coplanar, and parallel elongated rods having free ends extending horizontally in one direction through the center of said entrance and towards said pivotal mounting, a vertical pivotal shaft on said trap within the plane of relative movement of the jaws positioned to one side of said entrance and remote from said pivotal mounting and to which the opposite ends of said rods are secured, a latch means having lateral width and pivotally connected to said frame and movable in the plane of the first jaw for releasably holding said first jaw in open position and extending transversely to said entrance and remote from said entrance relative to said contact means, said latch means being operable by a locking means operatively connected to said animal contact means, said locking means extending transversely to said entrance and substantially oppositely directed with respect to said contact means from said pivotal means, said locking means including a head integral and movable horizontally with said contact means, said head being elongated laterally in the direction of the pivotal movement and slidably engageable with said latch means, the elongation of said head and the width of said latch means being such that said head is permitted substantial pivotal movement and sliding contact with said latch means on the upper side of the latch means before releasing the latch means whereby an animal to be caught by the trap must move the contact means substantially away from the entrance before the head rides off the upper side of the latch means and releases the first jaw.

References Cited in the file of this patent

UNITED STATES PATENTS

| | | |
|---|---|---|
| 218,013 | Gleichman | July 29, 1879 |
| 1,749,870 | Beggs | Mar. 11, 1930 |
| 1,881,871 | Nerby | Oct. 11, 1932 |